INVENTORS
ROBERT H. BUSHNELL
DONALD C. EVANS
WILFORD L. STEINER
BY: *H.H. Oldham*
ATTORNEY

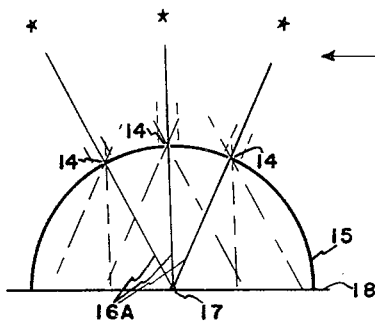
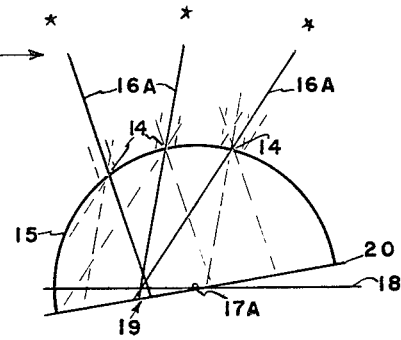
FIG.-5  FIG.-6
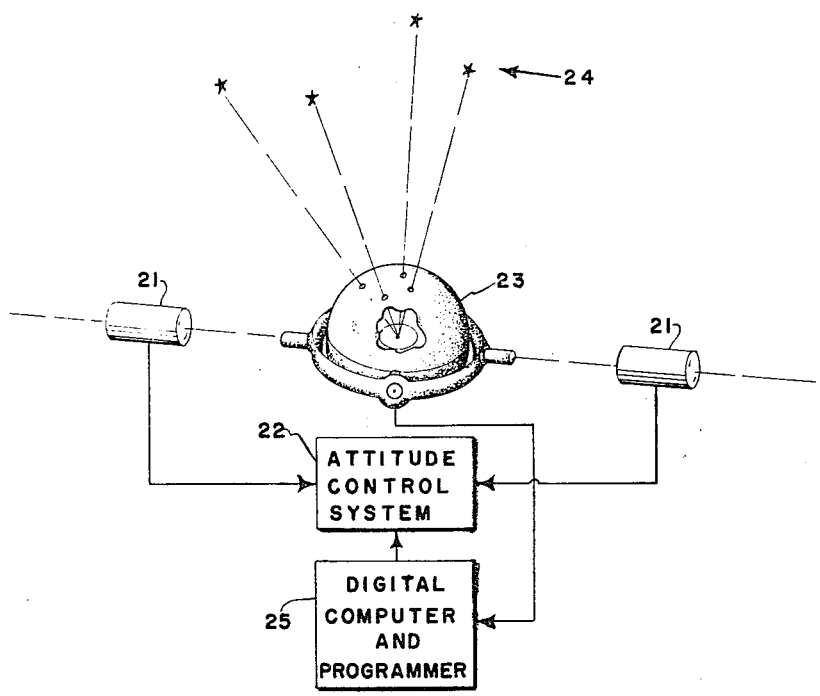
FIG.-7

INVENTORS
ROBERT H. BUSHNELL
DONALD C. EVANS
WILFORD L. STEINER

United States Patent Office 3,499,156
Patented Mar. 3, 1970

3,499,156
CELESTIAL MATCHING SYSTEM FOR ATTITUDE STABILIZATION AND POSITION DETERMINATION
Donald C. Evans, Cuyahoga Falls, and Wilford L. Steiner, Akron, Ohio, and Robert H. Bushnell, Boulder, Colo., assignors to Goodyear Aerospace Corporation, Akron, Ohio, a corporation of Delaware
Filed Feb. 16, 1966, Ser. No. 527,825
Int. Cl. G01j 1/24, 1/20
U.S. Cl. 250—203     2 Claims

ABSTRACT OF THE DISCLOSURE

A celestial matching system which matches a reference star field with an actual star field in the universe to determine celestial position. The reference star field is represented at holes positioned at specific locations in a plate with the holes adapted to pass light from the stars through the plate whereby when the plate is aligned with the celestial star field represented by the holes thereon the light of the stars passes through the holes and comes to a focal point at the geometric center of the plate. Photocell sensing means are operatively positioned at the geometric center of the plate to determine when the plate containing the reference star field is in matched alignment with the celestial star field. Sun seeker means in combination with gyrostabilization means can be used to maintain the initial reference as required. Means to provide systematic search with the star field matcher from the initial reference to locate matched reference star field to the celestial star field may be provided.

---

This invention relates to a celestial matching system for use on a space vehicle which will effect attitude stabilization and position determination for the vehicle, and more particularly relates to a matching system which will match a reference star field therein with an actual star field in the universe to determine attitude reference to determine celestial position.

It is known that the problem of guidance to near planets or in interstellar space consists of establishing suitable trajectories and determining the measurement procedures that can be utilized to maintain these trajectories. The difficulty that now exists rests with the question of what type of instrumentaion can be used to make these measurements to the required accuracy. The well known inertial navigation system utilized on many missiles today must utilize gyrostabilization throughout its flight trajectory. However, a celestial matching system can start from complete shut-down and search and lock onto a specific star field to establish any desired attitude reference at any time during the flight trajectory.

Systems based on the application of information comparison and correlation techniques, such as star field matching, have been under study for several years. Many variations and approaches have been considered, wherein various types of active or passive measurement techniques have been proposed. However, in the proposals heretofore, although star matching may be used to establish attitude, either continuous operation or a highly complex lock-on scheme has been required because of the trackers difficulties in distinguishing among the individual stars. The usual procedure has been to lock-on to an individual star at the start of the trajectory, and to maintain lock-on throughout the flight to maintain attitude reference. Thus, positive control must be maintained on the craft or the lock-on instrumentation at all times to maintain lock-on.

In contrast to the conventional single star tracker, the star field matching system takes advantage of the already calibrated celestial sphere to provide a solution for attitude stabilization and the measurement of large angles in space. The employment of correlation techniques for matching a chosen star field against a star map contained within the space vehicle will yield a system which can start from a complete shut-down and, in a short time, search out and lock-on to the specific star field, thus providing a desired attitude reference.

It is the general object of the invention to avoid and overcome the foregoing and other difficulties of and objections to prior art practices by the provisions of a highly effective star field matching system utilized to attain attitude reference in a space vehicle, which system is highly effective and accurate, which system is low in cost, and which system is adaptable for use with conventional space guidance equipment.

Another object of the invention is to provide a star field matching system which utilizes a half spherical shaped plate with holes positioned therein to represent a star field, wherein the natural electromagnetic radiation from the stars is used as a source of illumination, and wherein this light is measured by a light sensing means to determine when matching is achieved to thereby indicate lock-on.

Another object of the invention is to provide a star field matching system wherein a plurality of stars can be matched to a reference map without using any special telescopic enlarging means.

Another object of the invention is to provide a star matching system to provide attitude reference and celestial position determination, and which system may function at any time during a flight so that positive attitude control of the vehicle only has to be maintained at periodic intervals when it is desired to determine celestial position.

Another object of the invention is to provide a star field matching system in a space vehicle to attain an attitude reference for the vehicle so the bearings to other known bodies may be taken to thereby determine the celestial position of the vehicle.

The aforesaid objects of the invention, and other objects which will become apparent as the description proceeds, are achieved by providing in a star matching system adapted to give attitude stabilization and position reference utilizing a star matcher the combination of a spherical section plate with a reference star field represented as holes positioned at specific locations in the plate, the holes adapted to pass light from the stars through the plate, the plate when aligned with the celestial star field represented by the holes thereon passing the light of the stars through the holes so that the light all comes to a focal point at the geometric center of the plate, photosensing means operatively positioned at the geometric center of the plate, the photosensing means determining when the plate containing the reference star field is in matched alignment with the celestial star field, sun seeker means adapted to give an initial reference to the location of the celestial star field, gyrostabilizing means to maintain the initial reference as required, and means to systematically search with the star matcher from the initial reference to locate and match the reference star field to the celestial star field.

For a better understanding of the invention reference should be had to the accompanying drawings, wherein:

FIGURE 5 is a schematic illustration showing how light from the celestial star field passing through a spherical reference star field map when properly aligned will focus at a match point on the photosensing means;

FIGURE 6 is a schematic illustration similar to FIGURE 5, but showing how the match point will be offset and not properly focused on the photosensing means if the reference spherical star field map is not in proper attitude;

FIGURE 7 is a perspective diagrammatic block diagram of a vehicle utilizing sun line seekers and a celestial star field matching attitude reference system;

STAR FIELD MATCHING EQUIPMENT

Figure 1:
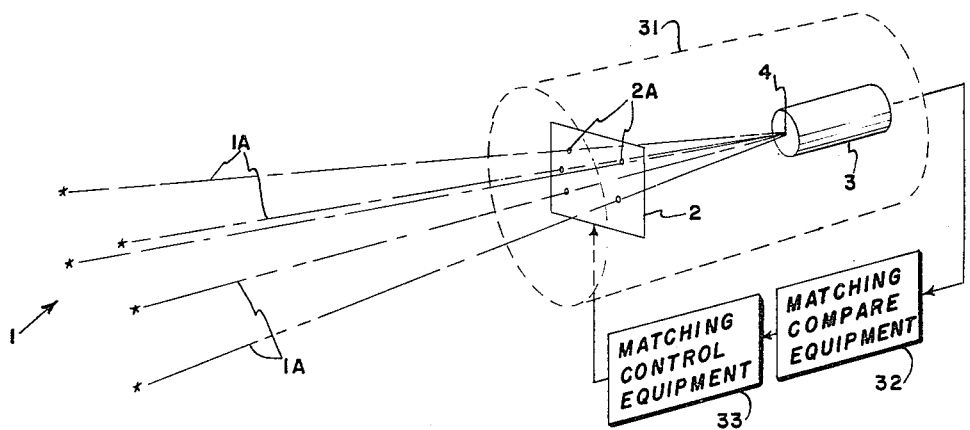
FIGURE 1 is a perspective schematic illustration of a star field matcher employing the principles of one embodiment of the invention which utilizes a flat plate and photosensing means.

With specific reference to the form of the invention illustrated in the drawings, the star field matching problem may be schematically shown as in FIGURE 1, wherein a chosen celestial star field, indicated generally by the numeral 1, is compared to a synthetic representation of the celestial star field 1 in the form of holes in a flat plate hereinafter called a star map, and indicated generally by the numeral 2. The light rays 1A from the celestial star field 1, pass through the holes 2A in the map 2 and thereby form an input to a detection system, or photosensing tube 3. The amount of light passing through the holes 2A in the map 2 which falls on the photosensing tube 3 is dependent on the orientation of the map 2 with reference to the celestial star field 1. When the map 2 is in the proper attitude for perfect alignment with the celestial star field 1, as shown in FIGURE 1, the light rays 1A converge to a focal point 4, which falls as a bright spot on the face of the photosensing tube 3.

Because the stars are so distant, a star map can be made almost a perfect non-distorted flat copy of the star field to which it is to be compared.

Figure 2:
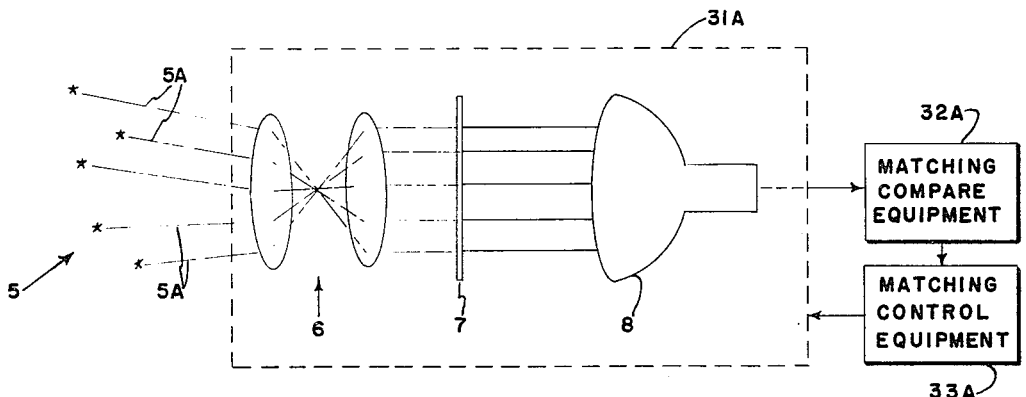
FIGURE 2 is a schematic illustration of a star field matcher utilizing a wide angle lens, a positive or negative matching image, and photosensing means.

FIGURE 2 illustrates another apparatus to achieve star field matching, wherein light rays 5A from a celestial star field, indicated generally by numeral 5, are focused by a wide angle lens 6 onto either a positive or negative image 7 of the celestial star field 5. The light rays 5A passing through the image 7 are sensed by a photosensing tube 8. If the image 7 is a negative, a match will occur when tube 8 detects a minimum amount of light passing therethrough, and conversely, if the image 7 is a positive, a match will result when tube 8 detects a maximum amount of light.

The star map 2 and photosensing tube 3 of FIGURE 1 form a map matching unit, as shown by block 31 indicated by dotted lines. The output from the map matching unit 31 is an input signal to matching compare equipment, indicated by block 32. The compare equipment 32 sends a signal to matching control equipment, indicated by block 33, which control equipment 33 in turn effects control of the map matching unit 31 to establish initial match between the star field and the map 2, and to maintain the match after establishment. For a description of the possible operation of the map matching techniques and the equipment represented as contained in blocks 31, 32, and 33 reference should be had to U.S. Patent Nos. 3,178,707; 3,192,522; and 3,194,511. However, map matching techniques are well known in the art. The equipment indicated by blocks 31A, 32A, and 33A in FIGURE 2 correspond to those corresponding systems described above with reference to FIGURE 1.

Figures 3, 4:
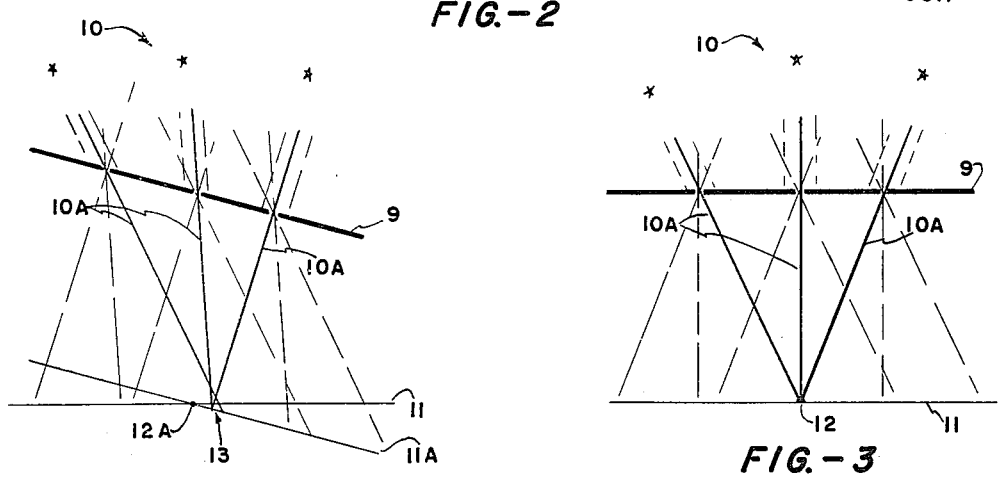
FIGURE 3 is a schematic illustration showing how light from the celestial star field passing through a flat reference star field map will focus at a match point on the photosensing means when properly aligned.
FIGURE 4 is a schematic illustration, similar to FIGURE 3, but showing how the match point is offset and not properly focused on the photosensing means if the star field map is not in proper attitude.

With reference to FIGURE 3, when a star map 9 is a flat plate, and is perfectly aligned with a celestial star field 10, as described with reference to FIGURE 1 above, each star of the chosen celestial star field 10 will pass a light ray 10A to form a disc of illumination and these disc will overlap forming a relatively bright disc at the focal point or match point 12. A misalignment of the system, as shown in FIGURE 4, will produce a shift of this bright spot or match point 12A to a spot 13 of overlapping light discs, as indicated. Spot 13 will not have the intensity of match point 12 indicated in FIGURE 3, since spot 13 falls on plane 11A which is parallel to the disorientated reference star map 9, so that spot 13 is not only shifted from the oriented match point 12, but is improperly focused. Rotation about the centerline of the system will cause the light discs caused by the light ray 10A from the celestial star field 10 to disburse and the bright central spot 12, indicated in FIGURE 3, will disappear to indicate misalignment or non-match of the system.

Stars can also be represented in a curved surface, as indicated in FIGURE 5, by a plurality of holes 14 in a spherical section star map 15. In this instance, if the star map 15 is properly aligned, as described above, light rays 16A from a celestial star field, indicated generally by numeral 16, causes a match point 17 on plane 18. Again, as with the flat reference map, the match point is displaced with disorientation. In FIGURE 6, the star map 15 is rotated to the left causing a shift of the orientated match point 17A on plane 18 to a badly focused spot 19 on plane 20. Note again, that match point 19 is laterally displaced, and of less intensity than match point 17 indicated in FIGURE 5.

Attitude sensitivity can be determined by understanding that the device hunts about the match point through some disorientation angle, all as more full described in the patents on map matching techniques, as mentioned above and well known in the art. The match point displacement can be evaluated in terms of the disorientation, stellar elevations, and the displacement of the light discs from the match point.

A comparison of the disorientation sensivity of the two types of maps as a function of stellar elevation shows that the spherical map, indicated in FIGURES 5 and 6 has less variation than the flat map, indicated in FIGURES 3 and 4, especially for low angle stars. Thus, for most situations the spherical map appears to be most satisfactory.

SYSTEMS APPLICATIONS

A star matching system is ideally suited to provide assistance in obtaining position data and attitude reference for various space guidance schemes. A star matcher in combination with other well known and conventional instruments will furnish precision information for all phases of space guidance and navigation.

FIGURE 7 illustrates one use of the star field matching system for determining attitude information along the trajectory of an interplanetary flight. This system utilizes two sun seekers, indicated by numeral 21, which establish a sun-vehicle line, and feed their information into an attitude control system 22 which utilizes rate gyros to stabilize the vehicle in one direction on the sun. A star matcher, indicated generally by numeral 23, is then placed in the tracking mode to search for a celestial star field, indicated generally by numeral 24. After the star matcher 23 completes a lock-on, it provides an attitude reference and feeds this information into a digital computer and programmer 25, so that attitude command signals from the programmer 25 to the control system 22 will bring the vehicle into the desired attitude orientation.

This type of attitude stabilization system lends itself well to space flights that will require long periods of time, and where power and reliability are placed at a premium. Since the system is not required to be operative at all times, the power requirements will be greatly reduced over those systems requiring a constant power demand. Component operating time is also reduced which means higher reliability of the system.

Figure 8:
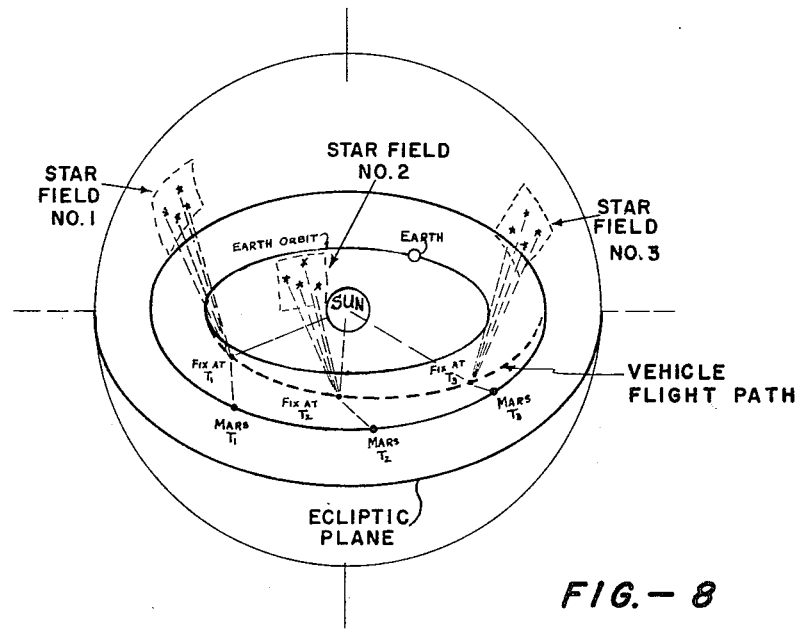
FIGURE 8 is a perspective diagrammatic illustration of position fixing of a vehicle utilizing star field matching techniques for attitude reference.

FIGURE 8 shows a celestial sphere and the use of pre-chosen star fields at programmed time intervals for establishing the heliocentric latitude and longitude of a space vehicle moving in the ecliptic plane. Since stellar parallax can be assumed negligible over base lines on the order of $10^8$ miles, matching to as few as any three bright stars from anywhere this close to the sun would uniquely establish the absolute heliocentric attitude reference. The position of the vehicle is determined by tracking the destination planet of Mars in this case, and the sun, all as shown in the illustration of FIGURE 9.

The star fields may be chosen for each particular position fix time along the flight trajectory of the space vehicle, or the same star field may be used each fix, since the star field only establishes attitude reference. However, knowing the time at launch, a plurality of star field maps may be prepared in advance for the position fixes at programmed intervals of $t_1, t_2, t_3 \ldots t_n$ with respect to the sun-vehicle line. At each position fix, the sun-vehicle line would be established and then the appropriate star field reference map would be used in the matching system to determine vehicle attitude and heliocentric latitude and longitude. A tracker may be used to complete the position fix by taking a line on the target planet and some other planet or the sun during the time of the known reference determined by the star field matching technique.

Figure 9:
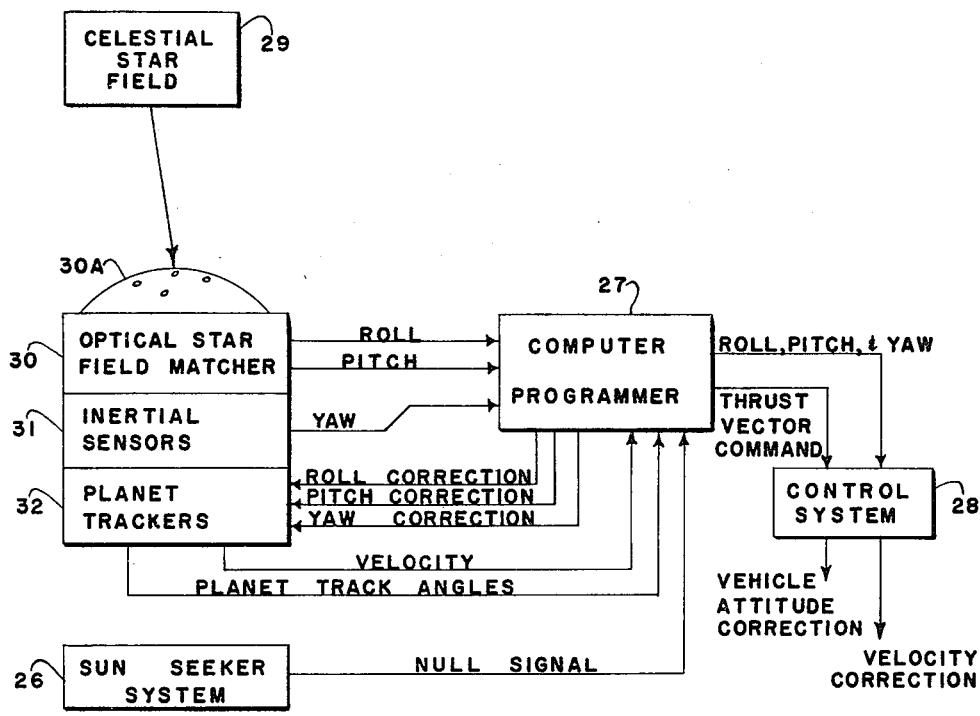
FIGURE 9 is a block diagram of a space navigation system utilizing the star field matching techniques of the invention.

A simplified block-diagram of a possible navigation system utilizing a star matcher to establish the attitude reference frame is shown in FIGURE 9. In this application a sun seeker system 26 could be a standard component utilizing an infra-red seeking device well known by the art. The sun seeker system 26 is used to establish a vehicle-sun line, as explained heretofore, by first feeding a null signal to a computer and programmer 27. The computer and programmer 27 is a standard, well known component and could be a Librascope AN/ASN-24 digital computer made by the Librascope Incorporated of 810 Western Ave., Glendale, Calif. The information from the computer and programmer 27 feeds information in roll, pitch and yaw plus thrust vector commands to a control system 28. The control system 28, although directed to this specific apparatus, is a conventional system easily within the capability of one skilled in the art. The control system 28 establishes the vehicle on a sun line in accordance with the command signals from the computer and programmer 27. The control system 28 in conjunction with the computer and programmer 27 then commences a systematic search for a predetermined celestial star field 29 utilizing an optical star field matcher 30 employing the star field matching technique as described heretofore. Because the sun line reference is used, the search pattern is materially reduced and a match is easily obtained between the celestial star field 29 and a reference star map 30A of the optical star matcher 30. The optical star field matcher 30, when locked-on to the celestial star field 29, sends signals to the computer and programmer 27 to establish and control the vehicle attitude by means of the control system 28.

Once the attitude reference has been obtained, an inertial sensors section 31 and a planet trackers section 32 establish a position fix of the vehicle, all as explained below. The planet track angles are sent from the planet trackers section 32 to the computer and programmer 27. The computer and programmer 27 determines the thrust correction necessary to achieve an orbit that will intersect the orbit of the destination planet at the proper time, and the inertial sensors section 31 determines and controls the acceleration and velocity of the vehicle during thrust correction periods. In this manner the vehicle trajectory is corrected as necessary at each fix to insure proper interception of the destination planet.

Therefore, it is seen that the star field matcher in FIGURE 9 is used to attain an attitude reference for the space vehicle. By using a celestial star field aligned substantially perpendicular to the orbit plane of the space vehicle, the attitude orientation of the vehicle may be obtained whenever required. Thus, controlled attitude of the vehicle is only necessary during the short interval of time required to obtain the celestial position fix and to effect the trajectory-correction maneuver.

The optical star field matcher of the invention does not utilize any complicated optical telescope means, but utilizes a unique matching principle whereby generally three or more stars from a predetermined celestial star field can be matched to a reference star map to obtain an accurate attitude reference for the vehicle.

While one specific embodiment of the invention has been illustrated and described in detail, it is to be particularly understood that the invention is not limited thereto or thereby, but that the inventive scope is defined in the appended claims.

What is claimed is:

1. In a star matching system the combination of a picture negative of a specific celestial star field, wide angle lens means adapted to see an area of the sky corresponding in size to the area of said celestial star field of said negative, said lens means focusing its image to a size corresponding to the size of said negative, light sensing means behind said negative to sense the amount of light passing therethrough, means to orientate said star field matching system to effect a search pattern, means to detect when the least amount of light is passing through said negative to indicate a match of said negative to said celestial star field, and means to maintain said match after said match has been established.

2. A star matching system according to claim 1 where a picture positive of a specific celestial star field is used in place of the negative, and including means to detect when the most amount of light is passing through said positive to indicate a match of said positive to said celestial star field.

References Cited

UNITED STATES PATENTS

| 3,025,023 | 3/1962 | Barghausen | 250—203 X |
| 3,041,011 | 6/1962 | Dhanes | 250—203 X |
| 3,169,319 | 2/1965 | Hoffmeister | 33—61 |
| 3,263,088 | 7/1966 | Goldfisher | 250—237 |
| 3,329,818 | 7/1967 | Woehl | 250—203 |

JAMES W. LAWRENCE, Primary Examiner

E. R. LA ROCHE, Assistant Examiner

U.S. Cl. X.R.

244—3.17; 250—237